(12) United States Patent
Goldring

(10) Patent No.: US 10,295,415 B2
(45) Date of Patent: May 21, 2019

(54) TEMPERATURE MEASUREMENT OF FIBER OPTICS BY MEANS OF THERMAL INDUCED FLUORESCENCE

(71) Applicant: Soreq Nuclear Research Center, Yavne (IL)

(72) Inventor: Sharone Goldring, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 162 days.

(21) Appl. No.: 15/502,860

(22) PCT Filed: Aug. 14, 2015

(86) PCT No.: PCT/IB2015/056198
§ 371 (c)(1),
(2) Date: Feb. 9, 2017

(87) PCT Pub. No.: WO2016/024251
PCT Pub. Date: Feb. 18, 2016

(65) Prior Publication Data
US 2017/0234742 A1    Aug. 17, 2017

Related U.S. Application Data

(60) Provisional application No. 62/037,613, filed on Aug. 15, 2014.

(51) Int. Cl.
*G01M 11/00* (2006.01)
*G01K 11/32* (2006.01)
*C03B 37/025* (2006.01)

(52) U.S. Cl.
CPC .......... *G01K 11/32* (2013.01); *C03B 37/0253* (2013.01); *G01M 11/30* (2013.01)

(58) Field of Classification Search
CPC ..... G01K 11/32; G01M 11/30; C03B 37/0253
See application file for complete search history.

(56) References Cited

U.S. PATENT DOCUMENTS

| | | | | |
|---|---|---|---|---|
| 4,673,299 A | * | 6/1987 | Dakin | G01K 11/32 250/458.1 |
| 5,051,595 A | * | 9/1991 | Kern | A62C 3/0271 250/227.14 |
| 5,560,712 A | * | 10/1996 | Kleinerman | G01J 5/08 250/227.14 |

(Continued)

OTHER PUBLICATIONS

PCT Search and Written Opinion PCT/IB2015/056198, dated Nov. 24, 2015.

(Continued)

*Primary Examiner* — Natalie Huls
*Assistant Examiner* — Janice M Soto
(74) *Attorney, Agent, or Firm* — Dekel Patent Ltd.; David Klein

(57) ABSTRACT

A method for temperature measurement includes measuring intensities of two adjacent wavelengths emitted from a heated optical fiber and calculating the thermal population distribution between associated energy levels. The optical fiber is heated to induce fluorescence emission from the optical fiber. The optical fiber comprises $OH^-$ dopant ions. The fluorescence emission is due to a first overtone of vibration energy level of the $OH^-$ dopant ions.

5 Claims, 1 Drawing Sheet

(56) References Cited

U.S. PATENT DOCUMENTS 5,696,863 A * 12/1997 Kleinerman .......... F25B 23/003
250/227.11
5,928,222 A *  7/1999 Kleinerman .............. G01J 5/08
374/E11.017

OTHER PUBLICATIONS

Sun et al, "Fluorescence-based measurement schemes using doped fiber: theoretical analysis and experimental validation", Nonlinear Optics 98, IEEE, Aug. 10, 1998, pp. 107-109.
Wade et al, "Fluorescence intensity ratio technique for optical fiber point temperature sensing", Journal of Applied Physics, vol. 94, No. 8, Oct. 15, 2003, pp. 4743-4756.
Berthou et al, "Optical fiber temperature sensor based on upconvertion-excited fluorescence", Optical Letters, Optical Society of America, vol. 15, No. 19, Oct. 1, 1990, pp. 1100-1102.
Maurice et al, "High dynamic range temperature point sensor using green fluorescence intensity ratio in erbium-doped silica fiber", Journal of Lightwave Technology, IEEE, vol. 13, No. 7, Jul. 1, 1995, pp. 1349-1353.

* cited by examiner

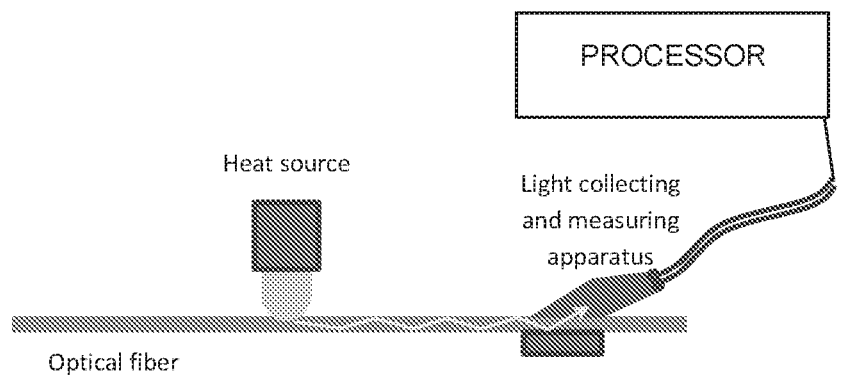

TEMPERATURE MEASUREMENT OF FIBER OPTICS BY MEANS OF THERMAL INDUCED FLUORESCENCE

FIELD OF THE INVENTION

The present invention relates to an optical method for temperature measurement. When operated, it enables on line precise temperature measurement of optical fiber components during fusion processes. Moreover, this method can be used as a temperature sensing in high temperature environments.

BACKGROUND OF THE INVENTION

Fused optical fiber components are nowadays very common in fiber laser, optical communications and other optical fiber based systems. The main process for manufacturing such a component is fusion of the fibers material in order to manipulate their shape. Usually, the heat for the fusion is generated by means of hydrogen flame, arc discharge, filament or laser beam. However, all of these methods require tightly controlling the amount of heat that is absorbed in the fibers for the process to be precise and reproducible. Controlling of heat absorption can be performed by measuring the temperature of the heated fibers section, which is typically 1-3 mm in length and 0.01-1 mm in diameter. Direct measurement of the temperature under such circumstances is complicated, since measurement by contact will disturb the fusion process. Another problem is that it is very difficult to distinguish between the fiber temperature and the temperature of the heat source itself without touching the fiber.

SUMMARY OF THE INVENTION

The present invention provides an indirect method for precise temperature measurement of optical fibers at high temperature environment. The method uses the fluorescence emitted from a small content of doping molecules (e.g., OH$^-$) inside the fiber. By calculating the ratio between the powers of two adjacent emission lines the population distribution between energy levels can be deduced. Since the population is temperature dependence via Boltzmann distribution, the temperature of the fiber can be concluded. Practically, the invention enables remote temperature measurement by means of optical fiber in the 800-2000° C. range.

There is thus provided in accordance with an embodiment of the present invention, a method for temperature measurement including heating an optical fiber to induce fluorescence emission from the optical fiber, the fluorescence emission including at least two emission lines having wavelengths j and k, respectively, and calculating a temperature T of the optical fiber by solving for T in equation:

$$\frac{I_j}{I_k} \approx \frac{\exp\left(\frac{-\Delta E_{j,0}}{k_b T}\right)}{\exp\left(\frac{-\Delta E_{k,0}}{k_b T}\right)} \left(\frac{A_{j,0}}{A_{k,0}}\right)$$

wherein:

$I_m$ is measured emission intensity at wavelength m, $\Delta E_{m,0}$ is energy gap between an emission level associated with wavelength m and ground level (0 level), $k_b$ is Boltzmann constant (about $1.3806488 \times 10^{-23}$ J/K), T is absolute temperature (K) of the optical fiber and $A_{m0}$ is Einstein constant (probability per unit time that an electron in an energy state at the emission level associated with the wavelength m will decay spontaneously to the ground level).

The fluorescence emission may be due to a first overtone of vibration energy level of dopant ions (e.g., OH$^-$ ions) existing in the optical fiber.

Apparatus is also provided for temperature measurement including a heater operative to heat an optical fiber to induce fluorescence emission from the optical fiber, the fluorescence emission including at least two emission lines having wavelengths j and k, respectively, an optical detector operative to detect the emission lines, and a processor operative to calculate a temperature T of the optical fiber by solving for T in the above equation.

BRIEF DESCRIPTION OF THE DRAWINGS

The present invention will be understood and appreciated more fully from the following detailed description taken in conjunction with the drawings in which:

FIG. 1 is a simplified illustration of a device and method for optical temperature measurement, in accordance with a non-limiting embodiment of the present invention.

DETAILED DESCRIPTION OF EMBODIMENTS

When heating silica fiber above room temperature, a weak but measurable optical radiation at wavelengths around 1400 nm is revealed. The origin of this radiation is fluorescence emission related to the first overtone of the vibration energy level of dopant ions (such as OH$^-$ ions) existing in small concentrations in the fiber and occupying different sites. In addition, weaker emission lines around 1260 nm can be observed; these are related to the sum of the first overtone of OH$^-$ ions and the first vibration of SiO$_4$ molecule ($2v_{OH^-} + v_{SiO4}$).

In order to deduce an accurate temperature, a complete measurement of the OH$^-$ emission spectrum can be fitted to the theoretical emission spectrum. The latter can be calculated, and is dependent upon known physical constants, the thermal population of the different energy levels and thermal broadening of the emitting levels. However, a much simpler calculation, as depicted below, has proven to be quite accurate. Here, the intensity of two emission lines around the 1400 nm band, namely, 1460 nm and 1396 nm are compared. It is assumed that the two lines experience the same thermal broadening and that they share the same partition function. Knowing their Einstein constants for spontaneous emission ($A_i$) the following equation can be written:

$$\frac{I_{1460}}{I_{1396}} \approx \frac{\exp\left(\frac{-\Delta E_{1460,0}}{k_b T}\right)}{\exp\left(\frac{-\Delta E_{1396,0}}{k_b T}\right)} \left(\frac{A_{1460,0}}{A_{1396,0}}\right),$$

where $I_j$ represents the measured emission intensity at the wavelength j, $\Delta E_{j,0}$ is the energy gap between a particular emission level associated with the wavelength j, and the ground level (0 level), $k_b$ is Boltzmann constant (about $1.3806488 \times 10^{-23}$ J/K), T is the absolute temperature (K) and $A_{j0}$ is the Einstein constant (probability per unit time that an electron in state i with energy at the emission level associated with the wavelength j will decay spontaneously to state 0 at the ground level). Plugging in the appropriate parameters and solving for T leads to:

$$T \approx \frac{-4822}{\ln\left(\frac{I_{1460}}{I_{1396}}\right) - 1.0057}.$$

It should be noted that some calibration constants may have to be added to refine the last equation for improved accuracy.

An instrument that performs in situ and on line temperature measurement during the fusion process includes an optical detector for detecting the emission lines and a processor for performing the temperature calculation. Optionally, at least two optical detectors may be used with two different spectral filters, wherein each one of the detectors measures only one of the OH⁻ emission lines. The detectors will be coupled to the processed fiber, preferably by side-coupling as close as possible to the heated zone, but could also be coupled to the end terminal of the processed fiber provided appropriate calibration is made. Using data acquisition and processing units (included in the processor), the ratio between the signals of the detectors may be used to calculate the fiber temperature.

It should be mentioned that this technique provides a weighted average measurement of the heated zone's temperature which is typically not uniform. In order to deduce the thermal distribution within the heated zone, an emission profile of the heated zone will have to be recorded and analyzed.

The invention claimed is:

1. A method for temperature measurement comprising:
heating an optical fiber to induce fluorescence emission from said optical fiber, wherein said optical fiber comprises OH⁻ dopant ions, said fluorescence emission comprising at least two emission lines having wavelengths j and k, respectively, and wherein the fluorescence emission is due to a first overtone of vibration energy level of said OH³¹ dopant ions;
measuring an emission intensity of said fluorescence emission; and
calculating a temperature T of said optical fiber by solving for T in equation:

$$\frac{I_j}{I_k} \approx \frac{\exp\left(\frac{-\Delta E_{j,0}}{k_b T}\right)}{\exp\left(\frac{-\Delta E_{k,0}}{k_b T}\right)} \left(\frac{A_{j,0}}{A_{k,0}}\right)$$

wherein:
$I_m$ is the measured emission intensity of said fluorescence emission at wavelength m, $\Delta E_{m,0}$ is energy gap between an emission level associated with wavelength m and ground level (0 level), $k_b$ is Boltzmann constant (about $1.3806488 \times 10^{-23}$ J/K), T is absolute temperature (K) of said optical fiber and $A_{m0}$ is Einstein constant (probability per unit time that an electron in an energy state at the emission level associated with the wavelength m will decay spontaneously to the ground level).

2. The method according to claim 1, wherein one of said two emission lines is below 1400 nm and another of said two emission lines is above 1400 nm.

3. The method according to claim 1, wherein one of said two emission lines is 1460 nm and another of said two emission lines is 1396 nm.

4. The method according to claim 3, wherein $$T \approx \frac{-4822}{\ln\left(\frac{I_{1460}}{I_{1396}}\right) - 1.0057}.$$

5. Apparatus for temperature measurement comprising:
a heater operative to heat an optical fiber to induce fluorescence emission from said optical fiber, wherein said optical fiber comprises OH⁻ dopant ions, said fluorescence emission comprising at least two emission lines having wavelengths j and k, respectively, and wherein the fluorescence emission is due to a first overtone of vibration energy level of said OH⁻ dopant ions;
an optical detector operative to detect said emission lines and to measure an emission intensity of said fluorescence emission; and
a processor operative to calculate a temperature T of said optical fiber by solving for T in the equation in claim 1.

* * * * *